(12) United States Patent
Bergstrom et al.

(10) Patent No.: US 6,641,206 B1
(45) Date of Patent: Nov. 4, 2003

(54) LOAD CARRYING ARRANGEMENT FOR A VEHICLE

(75) Inventors: Åke Bergstrom, Marlefred (SE); Michael Linden, Södertälje (SE); Anders Gustavsson, Gnesta (SE); Fredrik Modahl, Norsborg (SE); Jan Kuoppa, Borlänge (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 09/958,682

(22) PCT Filed: Apr. 13, 2000

(86) PCT No.: PCT/SE00/00700

§ 371 (c)(1),
(2), (4) Date: Oct. 12, 2001

(87) PCT Pub. No.: WO00/63060

PCT Pub. Date: Oct. 26, 2000

(30) Foreign Application Priority Data

Apr. 15, 1999 (SE) .............................................. 9901373

(51) Int. Cl.[7] .................................................. B60P 3/00
(52) U.S. Cl. .................. 296/187; 296/181; 296/203.01; 296/204; 296/1.1
(58) Field of Search .......................... 296/1.1, 181–183, 296/187, 203.01, 204, 30, 194; 280/786, 797, 798

(56) References Cited

U.S. PATENT DOCUMENTS

| 2,494,155 | A | * | 1/1950 | Bock et al. .................. 280/795 |
|---|---|---|---|---|
| 3,622,171 | A | * | 11/1971 | Gottschalk .................. 296/204 |
| 4,160,558 | A | | 7/1979 | Fritsch |
| 4,275,663 | A | * | 6/1981 | Sivachenko et al. ........ 296/182 |
| 4,288,957 | A | * | 9/1981 | Meehan ...................... 296/182 |
| 4,540,095 | A | * | 9/1985 | Wormser et al. ............ 212/299 |
| 4,570,973 | A | * | 2/1986 | Ewers et al. ................ 296/204 |
| 5,368,317 | A | * | 11/1994 | McCombs et al. .......... 280/797 |
| 5,501,504 | A | * | 3/1996 | Kunz .......................... 296/204 |
| 5,584,510 | A | * | 12/1996 | Thuliez ...................... 280/784 |
| 6,015,022 | A | * | 1/2000 | Thuliez ...................... 280/786 |
| 6,109,684 | A | * | 8/2000 | Beitnouer ................... 296/182 |
| 6,174,023 | B1 | * | 1/2001 | Booher ....................... 296/182 |
| 6,179,369 | B1 | * | 1/2001 | Bender et al. .............. 296/181 |

FOREIGN PATENT DOCUMENTS

| CH | 337415 | 5/1959 | | |
|---|---|---|---|---|
| GB | 2009680 | 6/1979 | | |
| GB | 1604026 | 12/1981 | | |
| JP | 354008320 A | * | 1/1979 | ................. 296/183 |
| SE | 362043 | 11/1973 | | |

* cited by examiner

*Primary Examiner*—D. Glenn Dayoan
*Assistant Examiner*—Greg Blankenship
(74) *Attorney, Agent, or Firm*—Ostrolenk, Faber, Gerb & Soffen, LLP

(57) ABSTRACT

A loadbearing structure for heavy vehicles, e.g. a freight vehicle, incorporates a box-shaped hollow unit (10) extending in the longitudinal direction of the vehicle. Wall elements (12, 14, 16, 18) of thin wall thickness are connected to one another to form the box-shaped unit (10). The invention provides a loadbearing structure (2) for heavy vehicles which is many times more rigid than conventional structures but is nevertheless of relatively low weight and is relatively easy and inexpensive to manufacture. The present invention also relates to a process for manufacturing a loadbearing structure for heavy vehicles.

20 Claims, 3 Drawing Sheets

LOAD CARRYING ARRANGEMENT FOR A VEHICLE

BACKGROUND OF THE INVENTION

The present invention relates to a loadbearing structure for heavy vehicles, e.g. a freight vehicle, and to a process for manufacturing a loadbearing structure for heavy vehicles.

BACKGROUND AND STATE OF THE ART

A known practice for heavy vehicles, e.g. trucks and similar freight vehicles, is to design a loadbearing structure in the form of a vehicle frame. The commonest type of vehicle frame for freight vehicles is a ladder type of frame member structure which incorporates a pair of parallel longitudinal side members. These side members extend substantially along the whole length of the vehicle, on opposite sides of the vehicle. Along the whole length of the side members a multiplicity of transverse members are arranged at intervals and connect the side members to one another. Such a frame member structure supports the driving cab and a load surface, e.g. a load platform or fixed van superstructure. The frame member structure also caters for fitting various components of the vehicle, e.g. engine, suspension system, wheel shafts etc.

A loadbearing structure in the form of a frame structure for a heavy vehicle serves as the main loadbearing element for achieving strength and rigidity, unlike buses, for example, in which the whole of the bodywork affects their rigidity and strength. However, a traditional form of vehicle frame is designed to be relatively bendable and twistable (herein called torsionable), with the object of being able to cope with heavy loads and varying road conditions, ranging from forest roads or no roads at all to smooth motorways. However, this relatively low resistance to bending and twisting entails difficulties as regards the vehicle's running characteristics. It is also difficult on a torsionable vehicle frame to try to compensate for the vehicle's moderate running characteristics by installing some kind of sophisticated suspension system. As transport by heavy vehicles currently takes place largely on smooth roads and decreasingly on uneven forest roads and the like, better running characteristics on the latter have become increasingly important. Frame rigidity greatly influences the running characteristics. On a smooth road the running characteristics can be improved by increasing the rigidity of the frame.

When a heavy vehicle with a ladder type of frame member structure has to be equipped with a load surface in the form of a load platform or permanent van superstructure, it is usual for U-shaped members to be arranged at the bottom of the frame member structure to render the frame member structure rigid and provide support for the platform or van body relative to the frame members. This causes problems in that a built-on platform or van body is relatively rigid, whereas the frame member structure is torsionable, which means that special fastenings are required. U-shaped members for load platforms/van bodies cause an undesirable extra vehicle weight increase.

WO-A2-9414627 describes a loadbearing structure in the form of a vehicle frame for a motor vehicle, which incorporates a tubular extruded section designed to allow optimum utilisation of the space in the vehicle body. The tubular extruded section is used to accommodate such items as batteries, which are inserted into it by means of trolleys. The structure according to WO-A2-9414627 does not indicate any solution to the problems described with regard to the above state of the art.

DESCRIPTION OF THE INVENTION

The object of the present invention is to provide a loadbearing structure for vehicles, preferably heavy trucks, which is significantly more rigid than conventional structures and obviates said disadvantages of the state of the art. One object is therefore to provide a structure which results in better vehicle running characteristics in the most commonly occurring operating situations, which in the case of heavy trucks is relatively smooth roads. A further object is to provide a weight-optimised structure which is easy and inexpensive to manufacture. Another object of the present invention is to provide a structure which makes it easy to carry out repairs and servicing both of the frame and of components arranged on it, and to provide a large proportion of said components with an environment protected against external influences.

To these ends, the invention is a loadbearing structure for heavy vehicles, e.g. a freight vehicle, which incorporates a box-shaped hollow unit extending in the longitudinal direction of the vehicle. Wall elements of thin wall thickness are connected to one another to form the box-shaped unit. The invention provides a loadbearing structure for heavy vehicles which is many times more rigid than conventional structures but is nevertheless of relatively low weight and is relatively easy and inexpensive to manufacture. The present invention also relates to a process for manufacturing such a loadbearing structure for heavy vehicles.

An advantage of the solution according to the invention is that it makes possible a very torsion-resistant structure with low weight, resulting in better running characteristics, comfort and road holding as compared with structures according to the state of the art. It improves rigidity in all directions, but particularly the torsional rigidity. The loadbearing structure according to the present invention can increase the torsional rigidity of the vehicle frame by several thousand times and the bending resistance by about ten times. All the constituent elements of the structure participate in the distribution of forces and increase the rigidity. The structure according to the present invention also makes it possible to achieve a weight-optimised vehicle frame. It also facilitates repair and servicing work through good accessibility from the underside of the vehicle.

The box-shaped body is advantageously bounded by an upper roof wall element arranged horizontally, a lower bottom wall element and two vertical wall elements. The respective vertical wall elements and part of the horizontal wall element may advantageously be manufactured and designed integrally. This makes it possible to create mutually identical composite sections which are stackable and which also render the manufacturing process easier and more efficient. Two such separate elements which in certain cases are identical can be brought together at assembly stage to form a composite unit with vertical walls and a horizontal upper wall element. The respective vertical wall elements may thus advantageously be designed with a wall portion arranged substantially vertically which also incorporates part of a horizontal wall element extending from the upper end of the vertical wall element. The wall element thus forms an L-shape. Two opposite L-shaped wall elements placed at a distance from one another are joined together by the two respective protruding horizontal portions and form in combination with one another a composite unit incorporating the upper horizontal wall element and the vertical wall elements.

The wall elements for the box-shaped structure may preferably be in sheet form and largely consist of corrugated sheetmetal, which is much more rigid than entirely planar sheetmetal of the same thickness. The wall elements consist of material with thin wall thickness with a view to achieving a weight-optimised loadbearing structure. For application on a heavy freight vehicle, the material thickness in the case of sheet steel may be about 5 mm or less.

According to one embodiment, the box-shaped unit is provided internally with at least one supporting frame structure. The purpose of such a supporting frame is to reduce the risk of buckling of the constituent wall elements of the box-shaped unit. Advantageously, supporting frame structures are placed within and distributed along the whole of the box-shaped unit. The larger the number of supporting frames used in the box-shaped unit, the higher the torsional rigidity of the resulting structure. On the inside of the box-shaped unit, the respective supporting frame structures are firmly connected to the wall elements. Each supporting frame structure is a homogeneous frame, advantageously integral, which has a substantially square shape and a central aperture. The supporting frame incorporates an upper and a lower horizontal element and, arranged between them, two substantially vertical elements at a distance from one another. The supporting frame may also have other suitable geometrical shapes, e.g. rectangular or parallelepipedic. The thickness and extent of the supporting frame in the longitudinal direction of the box frame are small relative to the latter's extent in the width and height directions, i.e. transverse to the extent of the box-shaped unit in the longitudinal direction.

According to another embodiment, the loadbearing structure incorporates supporting devices arranged on the outside of the substantially vertical wall elements of the box-shaped unit. These supporting devices are advantageously placed in the longitudinal direction on the outside and distributed along substantially the whole of the box-shaped unit. The supporting devices have advantageously in the vertical plane an extent which corresponds to the vertical plane for a supporting frame and serve primarily as supports for the sheetmetal panels which constitute the vehicle's load surface.

The loadbearing structure has a load surface arranged on its top side. The upper horizontal wall element may preferably consist of corrugated sheetmetal which, according to a further embodiment, may have a planar panel arranged permanently on its top side. The result is a structure with great shear resistance which at the same time provides a load surface on the top of the panel. Such a panel may be of metallic material such as aluminium or, for example, wooden material such as plywood.

In accordance with the process for manufacture of a loadbearing structure for heavy vehicles according to the present invention, the constituent wall elements of the box-shaped unit are made of thin sheetmetal material. The wall elements may have dividing lines in both the transverse and longitudinal directions of the vehicle and be fastened along them at every second one to form a torsion-resistant box-shaped unit. The wall elements may be manufactured by a simple rolled forming process or by rolling mill forming. Said load surface, preferably made of corrugated sheet steel, may also be manufactured by rolled forming.

According to a preferred embodiment, the assembly of the loadbearing structure according to the present invention involves first fitting one or, advantageously, a multiplicity of supporting frame structures to the bottom wall element. Thereafter, suspension devices and other vehicle components which are to form part of the box-shaped unit are fitted to the supporting frame structures before the L-shaped elements are fastened to the supporting frame structures to form the box-shaped unit. Thereafter, preassembled vehicle components such as wheel shafts, gearbox, engine and cab body are fitted to the suspension devices before the supporting devices and their load surface are fitted. Manufacture may take place in large sections and in modules which substantially simplify assembly and disassembly. When components in the box-shaped unit have to be serviced or repaired, only a bottom wall element need be removed.

DESCRIPTION OF THE DRAWINGS

The invention is described below in the form of a non-limitative embodiment according to the present invention, with reference to the attached drawings, in which.

DESCRIPTION OF AN EMBODIMENT

Figure 1:
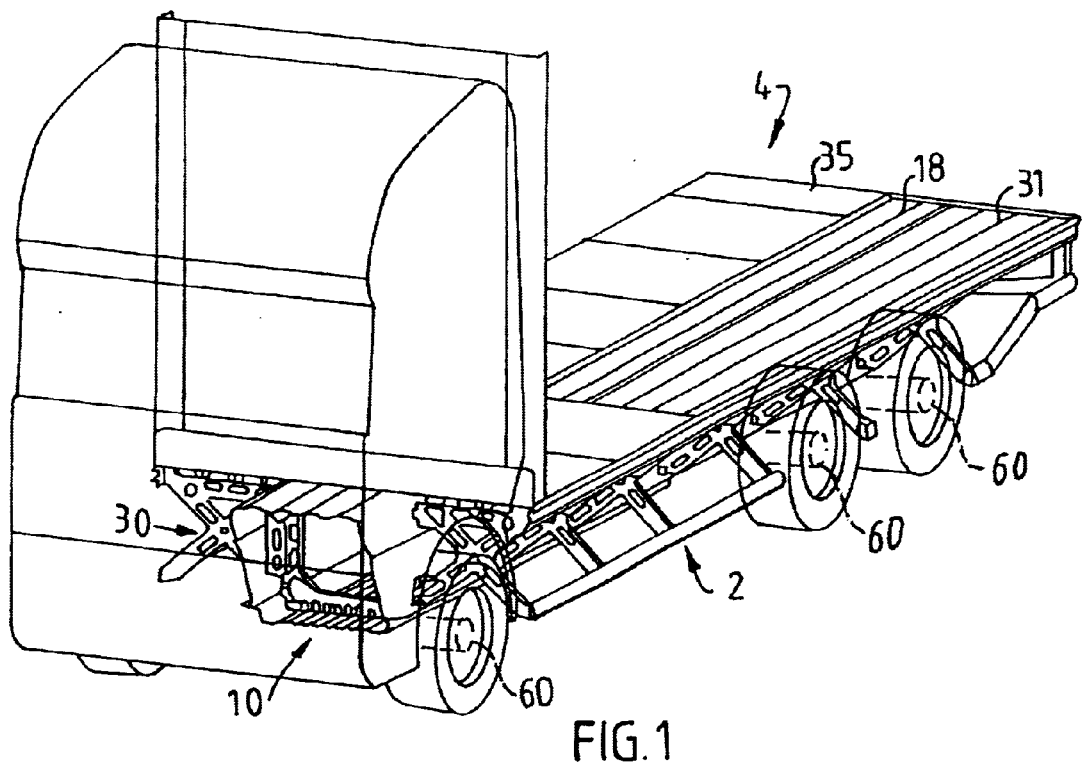
FIG. 1 depicts in a partly sectioned perspective view a schematic diagram of a heavy vehicle and its loadbearing structure according to the present invention.

FIG. 1 shows a schematic diagram of a heavy vehicle and its loadbearing structure 2, with a load surface 4 preferably incorporating underlying corrugated thin sheetmetal 18,31 and a panel 35 arranged on the sheetmetal. Advantageously the panel may be divided into a number of sections, as shown in the drawing. The loadbearing structure 2 incorporates a hollow box-shaped unit 10 (hereinafter called the box 10) extending in the longitudinal direction of the vehicle, and a number of supporting devices 30 connected externally to it.

Figure 2:
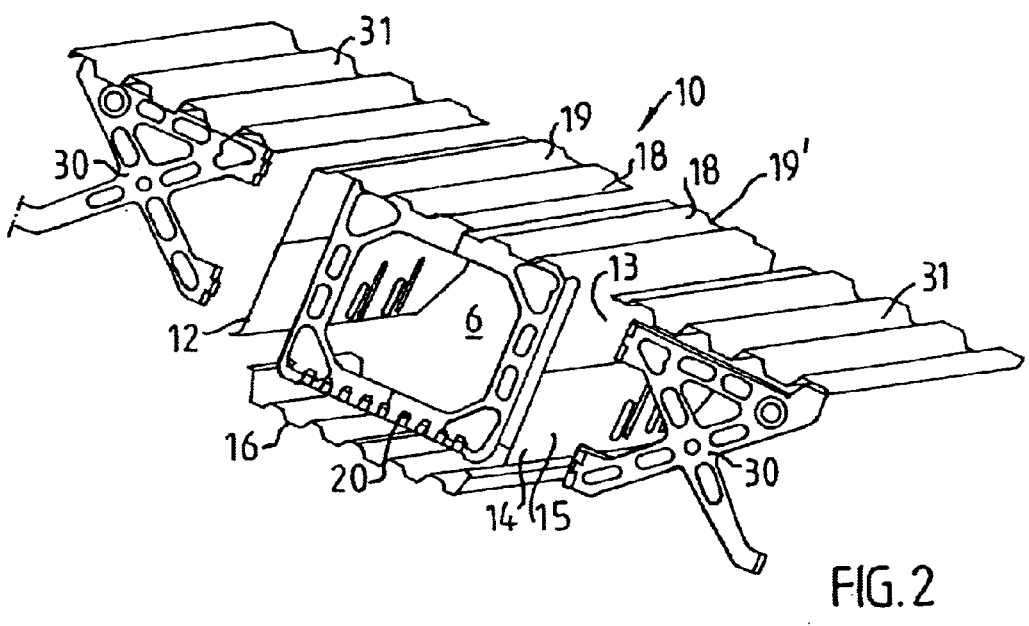
FIG. 2 shows in perspective the constituent elements of a loadbearing structure according to the present invention, separated from one another.

As may be seen in FIG. 2, the loadbearing structure is made up of wall elements 12,14,16 and 18 which form the box 10. FIG. 2 shows the constituent elements of the loadbearing structure 2 somewhat separated from one another for the sake of simplification. A bottom wall element 16 is connected to a multiplicity of supporting frame structures 20 (hereinafter called supporting frames 20) distributed along the box 10, to which a multiplicity of supporting devices 30 likewise distributed along the box 10 are also connected. FIG. 2 shows only one supporting frame 20 and one supporting device 30 and also shows both of them incorporating apertures for accommodating weight- and strength-optimised supporting frames 20 and supporting devices 30 respectively. The supporting devices and the supporting frames are each advantageously manufactured integrally in the form of a homogeneous frame 20, which is advantageously made of aluminium by die-casting or of pressed and stamped sheet steel.

An overlying surface portion 31 is arranged on top of the supporting devices 30 and the box 10. The surface portion 31 may advantageously consist of corrugated sheetmetal 18,31 and form a foundation for a load surface/load platform.

The box 10 may, as depicted in FIG. 2, consist of an upper roof wall element 18 arranged horizontally, a lower bottom wall element 16 and two vertical wall elements 12,14. The wall elements 12,14,16,18 have dividing lines primarily in the longitudinally direction of the vehicle and are intended to be fastened to each other along them to form a torsion-resistant box 10.

The vertical wall elements 12 and 14 are each connected at their respective upper ends to horizontal wall portions 19 and 19' respectively which form substantially the whole of the horizontal roof wall element 18. Each wall element 12 or 14 forms together with the respective wall portion 19 or 19' a single L-shaped unit which can advantageously be manufactured and formed integrally. The two separate L-shaped units 12,19 and 14,19' respectively are brought together at assembly stage and fastened to one another, e.g. by spot welding, to form a single unit incorporating vertical wall elements 12,14 and a horizontal roof wall element 18. The wall elements 12,14 and 18 may of course be made up of several smaller wall elements in the form of laid-on pieces of sheetmetal or the like joined together to form a complete wall element. Advantageously, the horizontal wall elements may be of corrugated sheetmetal while the vertical wall elements are substantially planar. In case of need, the planar vertical wall elements may in particular be provided with recesses and apertures through which components and connections between them may extend.

Figure 3A:
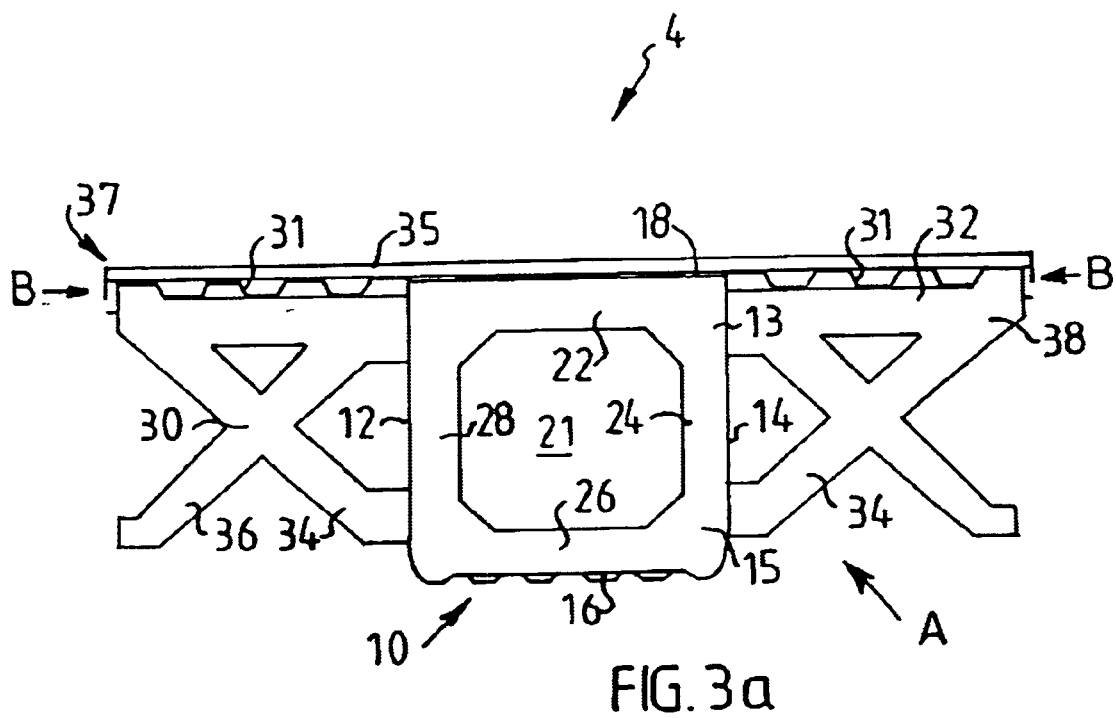
FIG. 3a shows an end view of a loadbearing structure according to the present invention.

FIG. 3a shows an end view of the loadbearing structure according to the present invention incorporating the box 10 composed of the wall elements 12,14,16 and 18, a supporting frame 20 and, firmly connected to the outside of the box 10, supporting devices 30. FIG. 3a also shows how the load surface 4 consists of the panel 35 arranged on the corrugated sheetmetal 18,31.

The supporting frame 20 incorporates two parallel vertical leg elements 24,28 situated at a distance from one another, and horizontal upper and lower leg elements, 22 and 26 respectively, between which a central aperture 21 is formed. The supporting frame may have a substantially rectangular or, with advantage, a square cross-section. For a heavy-duty freight vehicle, the sides of the box 10 and hence of the supporting frame 20 may typically be between about 900× 900 mm and about 700×700 mm and, with advantage, about 800×800 mm.

The vertical wall elements 12,14 of the box 10 have the supporting devices 30 arranged on their outside, firmly connected to the box 10 at its upper portion 13 and its lower portion 15. Advantageously the respective supporting devices 30 are fastened to and situated in the same vertical plane as a supporting frame 20 arranged in the box 10. The connection between the supporting frames 20 and the supporting devices 30 is advantageously of the riveted or threaded connection type and the fact that the transmission of forces between them takes place via the intermediate wall element sheetmetal 12,14 results in the creation of a particularly torsion-resistant box 10. Each supporting device 30 has a horizontal leg element 32, a first diagonal leg element 34 and a second diagonal leg element 36 which extend substantially transversely to the extent of the box 10 in the longitudinal direction of the vehicle and substantially horizontally out from the box 10. The supporting device 30 is also of small extent in the longitudinal direction of the box 10 relative to that in its transverse direction, and said extent is with advantage substantially the same as that of the respective supporting frame 20.

The horizontally arranged leg element 32 of the supporting device 30 is with advantage designed as support for the overlying load surface 4. This results in a substantial advantage of the present invention in the possibility of creating a load surface integrated with the whole vehicle frame. Such a load platform also forms a substantial part of a loadbearing and torsion-resistant structure for the vehicle. The diagonal leg element 34 is force-absorbingly connected to the box 10 by one end of the leg element 34 being joined to the lower portion 15 of the respective vertical wall element and more specifically to the supporting frame 20 situated in the same vertical plane. The other end of the leg element 34 is adjacent to the outer end of the horizontal leg element 32 at a formed edge portion 38. One end of the diagonal leg element 36 is connected to the upper portion 13 of the respective vertical wall element and is more specifically connected force-transmittingly to said supporting frame 20 situated in the same vertical plane. The other end of the leg element 36 has a lower end portion which is directed along the vehicle and which serves as fastening points for, for example, side underrun protection (not depicted) placed along the vehicle.

The outer edge portion 38 of the leg element 32 serves as a supporting contact surface for a supporting member which is arranged in the longitudinal direction of the vehicle and which may be seen in more detail in FIG. 3c below. The edge portion 38 also has, with advantage, a design which is adapted to accommodate a formed fold (or a corrugation) of the overlying corrugated sheetmetal 31, whereby the edge portion thus serves to secure the sheetmetal.

Figure 3B:
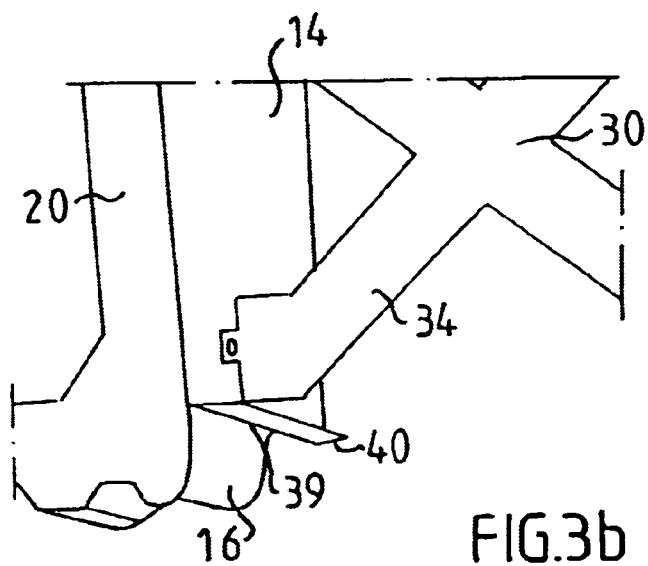
FIG. 3b shows in sectioned perspective an enlargement of a view A in FIG. 3a, FIG. 3c shows in cross-section an enlargement of a detail B in FIG. 3a, FIG. 3d shows in plan side view a supporting frame structure for the loadbearing structure

FIG. 3b shows an enlargement of a view A in FIG. 3a. The vertical wall element 14 is firmly arranged to the lower bottom wall element 16 by means of a stiffening connection 39 in the form of a joint in the longitudinal direction of the vehicle. This connection may for example in certain sections/modules of the box 10 be of the spot weld or riveted type, but may also for certain other applications be entirely of the releasable connection type such as a threaded connection. This latter case thus makes it possible, when necessary, to remove one or more bottom wall elements in order to facilitate the servicing or repair of components situated in the box 10. The connection 39 extends advantageously along the whole of he sides of the box 10 and has, facing away from the box, a flange 40 which protrudes along the whole joint and is formed by the joined wall elements 14,16.

Figure 3C:
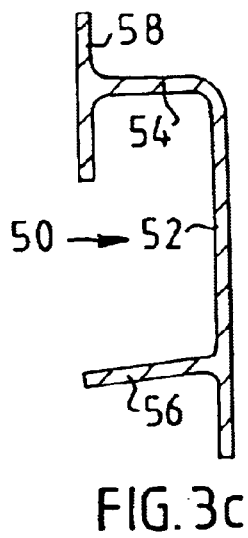
FIG. 3e shows in plan side view a supporting device for the loadbearing structure.
Figure 3D:
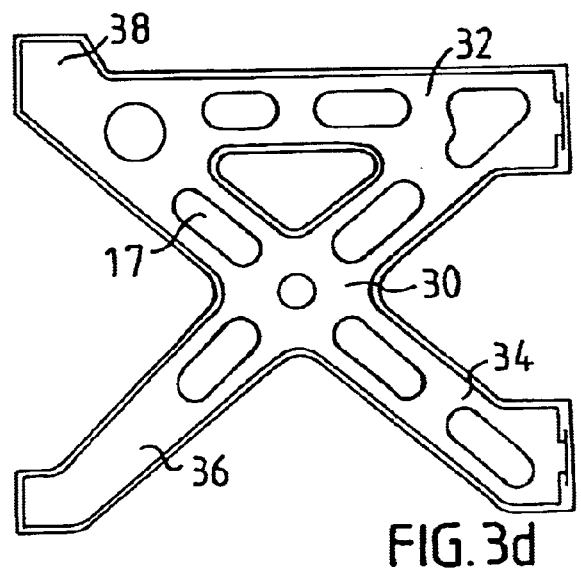
Figure 3E:
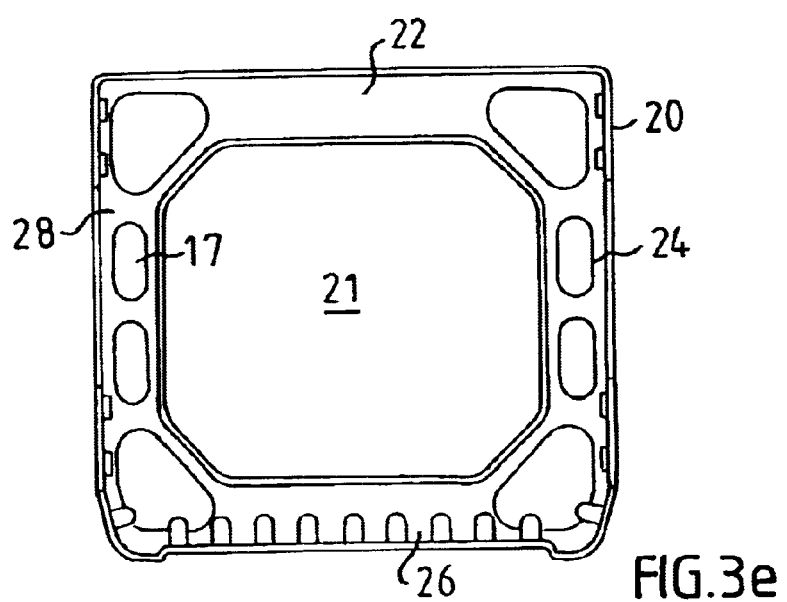

An enlargement of a detail B in FIG. 3a appears in FIG. 3c, which shows in section a supporting member 50 which is fastened by welding, riveting or threaded connection to a formed edge portion 38 of the respective supporting device 30 and along the whole outer edge 37 of the load surface 4. The supporting member 50 incorporates a vertical portion 52 and, extending perpendicular from the latter, an upper horizontal portion 54 and a lower horizontal portion 56. The upper horizontal portion 54 is provided at its outermost part with a flange-forming portion 58 intended to be fastened to the whole outer edge 37 of the load surface 31. The supporting member 50 thus helps to provide the structure according to the invention with further rigidity.

The first step in assembling the loadbearing structure for a freight vehicle according to the present invention is to fit one and, advantageously, a multiplicity of supporting frames 20 to the bottom wall element 16, which is with advantage divided into a number of sections, whereby said supporting frames 20 and bottom wall element sections will form a lower box element. Advantageously, fitting to the bottom wall element 16 is carried out, as mentioned above, by releasable connection, e.g. threaded connection, at least several supporting frames 20. This is followed by fitting to predetermined supporting frames 20 vehicle components (not depicted) intended to be more or less enclosed in the box 10, such as brake valves and brake cylinders, suspension devices for wheel shafts, engine, gearbox, vehicle bodywork (the truck cab) etc. At a subsequent stage the mutually preassembled L-shaped elements 12,19 and 14,19' respectively are brought together and fastened to the supporting frames and bottom wall element sections situated in the lower box element to form the torsion-resistant box 10. This creates a protected environment for the vehicle components such as engine, gearbox, steering gear and brake cylinders which can to a greater or lesser extent be fitted inside the box 10. Fastening to the supporting frames is advantageously done by spot welding or seam welding, but riveting, nibbling or threaded connections may also be used in whole or in part. Releasable threaded connections are advantageous for connections to the removable bottom elements 16. Thereafter the suspension elements are used for fitting said wheel shafts, engine, gearbox and vehicle bodywork in the thus assembled box 10. Finally, each of the supporting devices 30 may also be fastened, by any of the aforesaid means, to the respective supporting frame 20, followed by the load surface 31,35 and any side underrun protection and the like being fastened to the support devices 30 and the roof wall element 18 of the box 10.

The above-mentioned suspension elements are shown schematically at reference 60 in FIG. 1. A substantial advantage of the invention is that it makes it possible to manufacture the box's wall section wall elements and load surface elements, both corrugated and uncorrugated, in large sections and modules by simple and inexpensive conventional rolled forming or rolling mill forming processes. For application on a heavy freight vehicle, the wall thickness of sheet steel of this type may be about 5 mm or less. It is advantageous to use a wall thickness of between about 2.0 mm and 3.5 mm. Should sheet aluminium be used, the thickness will of course be greater, of the order of about 5 to 7 mm. In a preferred embodiment, aluminium is used in supporting frames and supporting devices, while sheet steel electrically galvanised for the purpose is used for the wall elements. The screws/bolts and rivets used for connecting these elements to one another must also be electrically galvanised for corrosion reasons. Both the assembly of the vehicle and its loadbearing structure, including the box, and their disassembly may be substantially simplified by appropriate modular division.

What is claimed is:

1. A loadbearing structure for a freight vehicle, wherein the vehicle has a longitudinal direction and a transverse direction, the structure comprising:
    a hollow box extending in a longitudinal direction of the vehicle comprising a plurality of wall elements comprised of a material of small wall thickness and assembled and connected to each other to form said hollow box, at least one of said wall elements being made of corrugated sheet material;
    one of the wall elements is a bottom wall element at a bottom of the box, and the bottom wall element is divided into a plurality of sections along the longitudinal direction of the vehicle.
2. The loadbearing structure of claim 1, further comprising a supporting frame structure disposed inside the hollow box, the wall elements having an interior and the supporting frame structure being connected to the interior of the wall elements.
3. The loadbearing structure of claim 2, wherein the connections between the supporting frame structure and at least some of the sections of the bottom wall element are releaseable for enabling removal.
4. The loadbearing structure of claim 1, wherein the wall elements include a bottom wall element at a bottom of the box; the wall elements having an interior;
    a supporting frame disposed inside the hollow box, and the supporting frame structure being connected to the interior of at least the bottom wall element.
5. The loadbearing structure of claim 4, wherein the supporting frame structure comprises a plurality of frames located at spaced intervals along the longitudinal direction inside the hollow box.
6. The loadbearing structure of claim 5, wherein each of the supporting frames extends substantially vertically and transverse to the longitudinal direction of the vehicle.
7. The loadbearing structure of claim 6, wherein each of the frames has an aperture through it opening the frame along the longitudinal direction of the vehicle.
8. The loadbearing structure of claim 6, wherein each of the frames is an integrally formed frame separate from the box and located in the box, the frame having substantially a square shape and a central aperture which opens along the longitudinal direction of the vehicle with the frame installed in the box.
9. The loadbearing structure of claim 6, wherein the bottom wall element is divided into a plurality of sections along the longitudinal direction of the vehicle.
10. The loadbearing structure of claim 2, further comprising the wall elements of the box including vertically arranged wall elements each having an external side;
    supporting devices disposed outside the external sides of the vertical wall elements, the supporting devices extending transversely to the longitudinal direction of the vehicle and the supporting devices including force transmitting connections to at least one of the support frame and the respective one of the side walls where the supporting device is located.
11. The loadbearing structure of claim 10, wherein each of the support devices includes an upper horizontal leg and a diagonal leg oriented to intersect the horizontal upper leg.
12. The loadbearing structure of claim 10, wherein the supporting frame structure comprises a plurality of frames located at spaced intervals along the longitudinal direction inside the hollow box:
    each of the supporting devices is disposed along the longitudinal direction of the vehicle in the same plane as one of the supporting frames and transverse to the longitudinal direction of the vehicle;
    one end of the diagonal leg element being supportingly connected to a lower portion of the respective support frame in the respective plane.
13. The loadbearing structure of claim 10, wherein the box includes an upper horizontal wall element;
    the upper horizontal leg of the supporting device is positioned together with the upper horizontal wall element of the box to form an overlying surface adapted for supporting a load.
14. The loadbearing structure of claim 1, wherein the material of the wall elements is a thin sheet metal.
15. The loadbearing structure of claim 1, wherein the material of the wall elements is a thin sheet steel.
16. A loadbearing structure for a freight vehicle, wherein the vehicle has a longitudinal direction and a transverse direction, the structure comprising:
    a hollow box extending in a longitudinal direction of the vehicle comprising a plurality of wall elements comprised of a material of small wall thickness and assembled and connected to each other to form said hollow box;

wherein one of the wall elements is a bottom wall element at a bottom of the box, and the bottom wall element is divided into a plurality of sections along the longitudinal direction of the vehicle; and wherein the wall elements include two opposite, parallel, L-shaped cross section, longitudinally extending wall elements; each wall element including one leg arranged substantially vertically, and the substantially vertically extending legs of the L-shaped cross section wall elements are spaced apart; and each L-shaped cross section wall element including a horizontal leg which meets the horizontal leg of the other of the L-shaped cross section wall elements forming an upper horizontal wall element of the box.

17. A loadbearing structure for a freight vehicle, wherein the vehicle has a longitudinal direction and a transverse direction, the structure comprising:

a hollow box extending in a longitudinal direction of the vehicle comprising a plurality of wall elements comprised of a material of small wall thickness and assembled and connected to each other to form said hollow box;

wherein one of the wall elements is a bottom wall element at a bottom of the box, and the bottom wall element is divided into a plurality of sections along the longitudinal direction of the vehicle;

a supporting frame structure disposed inside the hollow box, the wall elements having an interior and the supporting frame structure being connected to the interior of the wall elements;

the wall elements of the box including vertically arranged wall elements each having an external side;

supporting devices disposed outside the external sides of the vertical wall elements, the supporting devices extending transversely to the longitudinal direction of the vehicle and the supporting devices including force transmitting connections to at least one of the support frame and the respective one of the side walls where the supporting device is located;

wherein the box includes an upper horizontal wall element and the upper horizontal leg of the supporting device is positioned together with the upper horizontal wall element of the box to form an overlying surface adapted for supporting a load; and a load surface of corrugated sheet metal extending over the upper horizontal leg of the supporting device and the upper horizontal wall element of the box.

18. A process for manufacturing a load bearing structure for a freight vehicle wherein the loadbearing structure includes a plurality of wall elements which form a box that extends in the longitudinal direction of the vehicle and which is hollow, the process comprising:

providing sheet metal material of thin wall thickness;

forming respective wall elements for the box from the sheet metal material, fastening the wall elements to each other along dividing lines extending along the longitudinal direction of the vehicle so that the hollow box has adequate torsional rigidity for loadbearing in a vehicle, at least one of said wall elements being made of corrugated sheet material;

the box includes a bottom wall element, a top wall element and side wall elements, and the process comprises applying each of a plurality of supporting frames to the bottom wall element at spaced intervals along the longitudinal direction of the vehicle;

fitting vehicle components in the form of suspension devices through the supporting frames on the bottom wall elements;

applying the bottom wall element, the top wall element, and the side wall elements together and fastening them to the supporting frames and to the bottom wall elements to form a torsion resistant box.

19. The process of claim 18, further comprising attaching pre-assembled vehicle components to pre-selected suspension devices fastened to the supporting frames.

20. The process of claim 18, wherein the bottom wall is produced by providing individual separate bottom wall elements; arranging the bottom wall elements in a row in a longitudinal direction of the vehicle; and connecting respective supporting frames being connected to at least some of the individual bottom wall element sections.

* * * * *